(12) United States Patent
Gelman

(10) Patent No.: US 6,581,138 B2
(45) Date of Patent: *Jun. 17, 2003

(54) BRANCH-PREDICTION DRIVEN INSTRUCTION PREFETCH

(75) Inventor: Anatoly Gelman, San Diego, CA (US)

(73) Assignee: STMicroelectronics, Inc., Carrollton, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/514,973

(22) Filed: Feb. 29, 2000

(65) Prior Publication Data

US 2002/0174303 A1 Nov. 21, 2002

(51) Int. Cl.$^7$ ................................. G06F 9/28
(52) U.S. Cl. .................. 711/125; 711/118; 711/122; 711/213; 712/234; 712/237; 712/238; 712/239
(58) Field of Search ............... 711/171, 204, 711/213, 143, 125, 118, 122; 712/207, 233–239

(56) References Cited

U.S. PATENT DOCUMENTS

| | | | | |
|---|---|---|---|---|
| 4,847,753 A | * | 7/1989 | Matsuo et al. | 712/238 |
| 5,317,720 A | * | 5/1994 | Stamm et al. | 711/143 |
| 5,333,296 A | * | 7/1994 | Bouchard et al. | 711/171 |
| 5,784,711 A | * | 7/1998 | Chi | 711/213 |
| 6,237,074 B1 | * | 5/2001 | Phillips et al. | 711/213 |
| 6,279,107 B1 | * | 8/2001 | Tran | 712/239 |

* cited by examiner

*Primary Examiner*—Than Nguyen
(74) *Attorney, Agent, or Firm*—Lisa K. Jorgenson; William A. Munck

(57) ABSTRACT

The invention provides a method and apparatus for optimizing instruction prefetch and caching in a processor. In the preferred embodiment, a path prediction circuit maintains information about which cache lines are likely to be executed in the future. This information is used to independently fetch the predicted cache lines, store them in a prefetch queue, and load them in to the instruction cache as instructions contained in these lines are about to be decoded by the processor. A plurality of cache lines can be in the process of being simultaneously fetched from main memory to load the prefetch queue.

31 Claims, 4 Drawing Sheets

BRANCH-PREDICTION DRIVEN INSTRUCTION PREFETCH

BACKGROUND OF THE INVENTION

1. Field of the Invention

This invention relates to a method and an apparatus for instruction caching in computer processors.

2. Description of Related Art

Known instruction memory caching schemes for computer processors use cache memory to improve processor efficiency. Typically, when an instruction is fetched by the processor, an instruction cache is accessed to determine whether a copy of the memory holding the instruction is in the cache. If so, the instruction is provided to the processor from the instruction cache. If not, the main memory is accessed and a portion of the contents of the main memory that contains the instruction is copied to the instruction cache. The copied information is a cache line.

Because the instruction execution path is likely to continue sequentially and because instructions are often repeatedly executed, once the cache line is cached, the processor need not access main memory so long as the instructions being executed are from cache lines resident in the instruction cache. Thus, caching instructions reduces processor delays that would otherwise result from main memory fetches.

One problem which has arisen in the art is that instruction caching does not avoid all instruction memory access delays. One reason for this is that when sequential instruction execution reaches the end of a cache line, the subsequent cache line must be fetched from instruction memory if the subsequent cache line is not already in the instruction cache. Waiting for the subsequent cache line stalls the processor. Another reason for processor stalls is because branch instructions alter the sequential instruction fetch sequence within the instruction execution path. Thus, the cache line that contains the next instruction that is to be executed after a branch instruction may not be resident in the instruction cache. This requires that the prior art fetch the target instruction from main memory instead of from the instruction cache.

Both of these reasons invoke a main memory fetch that results in the processor incurring delays that are relatively much longer than delays incurred due to fetches from the instruction cache. The fetch to main memory thus delays the processing of the instruction execution path until the fetch for the cache line containing the needed instruction is completed.

One skilled in the art will understand that the main memory may itself be cached (for example a level 2 cache). However the main memory cache is relatively slower than the instruction cache.

Another problem is that only one cache line is read from memory into the instruction cache at a time and during the fetch the instruction cache can not be accessed to get instructions. Thus, if a subsequently accessed cache line would have required a linefill from main memory, the processor would incur an additional delay for a second cache linefill request from main memory, after it fetched all needed instructions from the first line resident in the instruction cache.

Accordingly, it would be desirable to provide a caching scheme that predicts and pre-fetches a number of cache lines that are expected to be needed in the future to overlap this process with other processor activities and thus minimize the amount of time the instruction cache is unavailable to the processor.

SUMMARY OF THE INVENTION

The invention provides a method and apparatus for optimizing instruction prefetch and caching in a processor. In the preferred embodiment, a path prediction circuit maintains information about which cache lines are likely to be executed in the future. This information is used to independently fetch the predicted cache lines, store them in a prefetch queue, and load them in to the instruction cache as instructions contained in these lines are about to be decoded by the processor.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

Figure 1:
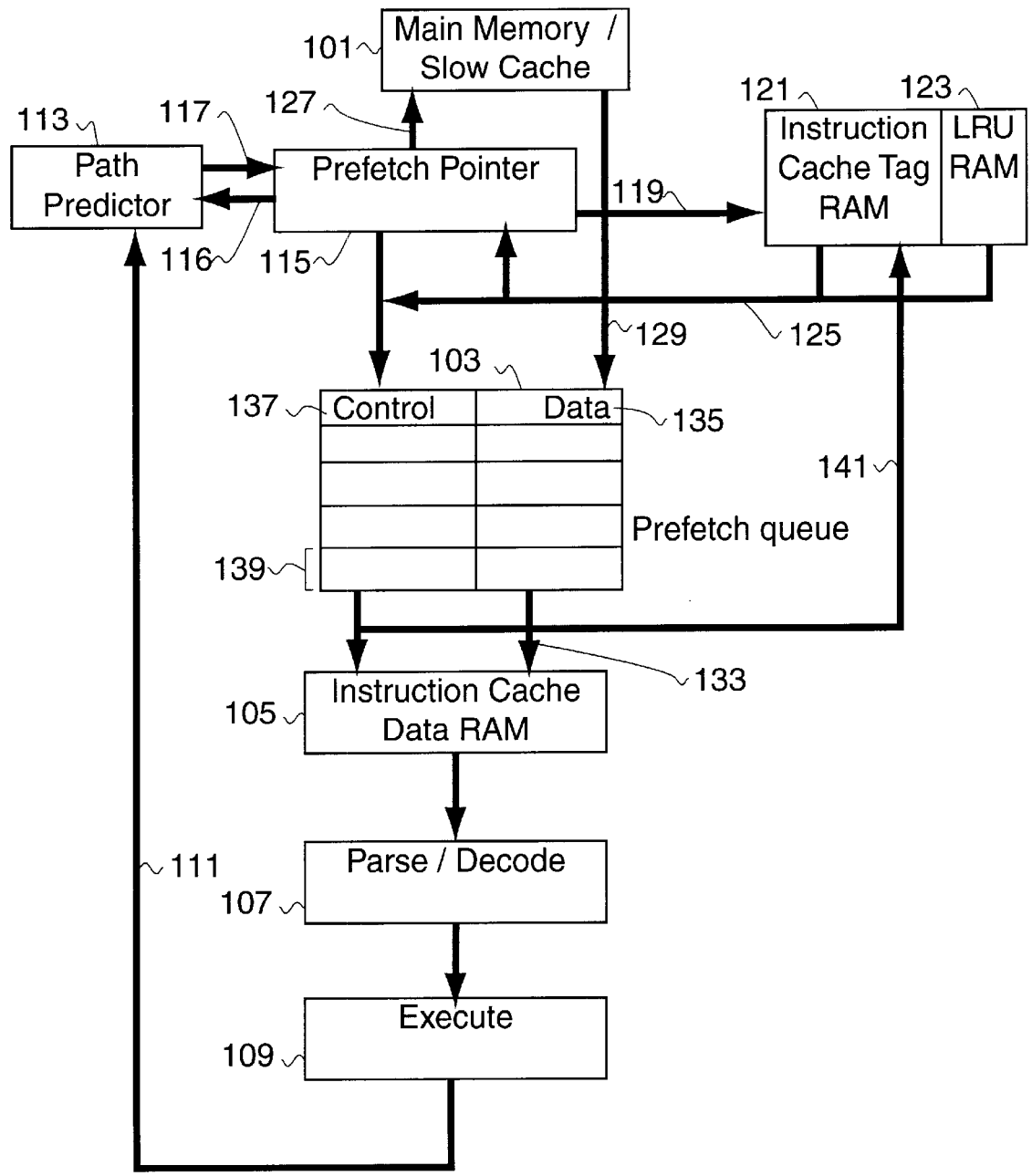
FIG. 1 illustrates an instruction processing architecture in accordance with a preferred embodiment.

FIG. 1 illustrates an instruction processing architecture, indicated by general reference character 100 that includes a memory system 101, a prefetch queue 103, an instruction cache (data) memory 105, an instruction parse/decode logic 107, and an instruction execute logic 109. Cache lines are fetched from the memory system 101 and cached in the instruction cache (data) memory 105 until instructions fetched from these cache lines are decoded and parsed by the instruction parse/decode logic 107 and executed by the instruction execute logic 109. The instruction cache (data) memory 105 is organized to so as to hold one or more instruction cache lines from the memory system 101.

The instruction execute logic 109 gathers information relating to the results of execution of control transfer instructions. This information is passed by an update/correct predictor path 111 to a path predictor logic 113 where the path predictor logic 113 adjusts its predictors dependent on the outcome of the execution. The processing of instruction data from the instruction cache (data) memory 105 by the instruction parse/decode logic 107 and the instruction execute logic 109 is relatively much faster than the time required to fetch an instruction cache line from the memory system 101. One of the goals of the invention is to preload the prefetch queue 103 so that the missing instruction cache line can be readily loaded into the instruction cache (data) memory 105 when it is needed, so that the instruction parse/decode logic 107 and the instruction execute logic 109 do not stall waiting for instruction data if the next cache line accessed by the program flow misses in the instruction cache.

The path predictor logic 113 communicates with a prefetch pointer logic 115 that includes a prefetch pointer and control logic for performing the prefetch operations described herein. The prefetch pointer logic 115 provides an 'advance predictor' signal 116 to the path predictor logic 113 when the prefetch pointer logic 115 finishes processing of sequentially fetched instructions contained in one cache line. The path predictor logic 113 responds to the 'advance predictor' signal 116 by providing a 'new prefetch pointer' signal 117 responsive to the past execution history. The 'new prefetch pointer' signal 117 includes the predicted address of an upcoming instruction. Upper bits of this address represent the address of the cache line that is expected to be needed. Thus, as the prefetch pointer logic 115 is able to initiate a linefill, the prefetch pointer is advanced along the instruction execution path.

One example of the path predictor logic 113 is provided by U.S. patent application Ser. No. 09/429,590 filed Oct. 28, 1999 entitled BLOCK-BASED BRANCH TARGET BUFFER hereby incorporated by reference in its entirety.

An instruction execution path is a sequence of addresses of executed instructions. Thus, given an address and an execution history, the path predictor logic 113 can predict the instruction execution path for the execution of subsequent instructions. The instruction execution path can be represented by a sequence of instruction cache lines. One skilled in the art will understand that this arrangement of the path predictor logic 113 and the prefetch pointer logic 115 allows the prediction of which instruction cache lines are to be executed based on the addresses of the cache lines being fetched.

A 'current prefetch pointer' signal 119 is provided to an instruction cache (tag) memory 121. The instruction cache (tag) memory 121 determines whether the instruction cache line containing the instruction at the 'current prefetch pointer' signal 119 is already in the instruction cache (data) memory 105. A LRU memory 123 is used when a cache miss occurs to identify which cache way the missing line is to be written to. The instruction cache (tag) memory 121 sends a 'hit/miss, way number' signal 125 result to the prefetch pointer logic 115 and the prefetch queue 103. The prefetch pointer logic 115 uses the 'hit/miss, way number' signal 125 to determine whether to originate a linefill request. If the instruction cache line is not currently cached nor in the process of being fetched, the prefetch pointer logic 115 sends a 'linefill request' signal 127 to the memory system 101 that will eventually respond with memory data 129. The memory data 129 supplied by the memory system 101 flows into the prefetch queue 103 where it is accumulated. After control information about one instruction cache line is loaded into the prefetch queue 103, another prefetch lookup operation can be initiated by the prefetch pointer logic 115. Thus, the prefetch pointer logic 115 initiates as many linefill requests as possible to the memory system 101. One skilled in the art will understand that some number of instruction cache lines within the predicted instruction execution path can thus be selected. The upcoming instruction cache lines are those in the instruction execution path that contain instructions that are expected to be executed relatively soon.

The prefetch queue 103 includes a data portion 135 and a control portion 137 organized into a plurality of entries. A prefetch queue entry 139 in the prefetch queue 103 is but one of the entries that can be contained by the prefetch queue 103. The prefetch queue entry 139 (as shown) is located at the head of the prefetch queue 103. An instruction cache line from the memory system 101 is read into the data portion 135 for each queued instruction cache line as it arrives from memory. The control portion 137 for each queued instruction cache line stores the status and address of the instruction cache line as received from the instruction cache (tag) memory 121. The address of the cache line is obtained from the prefetch pointer logic 115 and the status contains the 'hit/miss, way number' signal 125 from the instruction cache (tag) memory 121 and the LRU memory 123 associated with the instruction cache line.

Once the instruction cache line is completely fetched and stored in the prefetch queue 103, it is eventually transferred to the instruction cache (data) memory 105 (via a 'cache line data' signal 133) where it is made available to the instruction parse/decode logic 107 of the processor. At the same time, the address from the control portion 137 of the prefetch queue 103 is transferred to the instruction cache (tag) memory 121 via a 'tag fill data' signal 141.

One skilled in the art will understand that the prefetch queue 103 can have a fixed number of entries, a variable number of entries or otherwise. In a preferred embodiment, the prefetch queue 103 contains a fixed number of entries (for example eight entries). Such a one will also understand that the data portion 135 of each entry can be implemented as storage that can contain the entire cache line, or be a pointer or index to a pool of buffers that can contain the entire cache line (for example, the buffer pool may contain two buffers). The actual details of the implementation of the invention is subject to performance and cost tradeoffs and encompass many variations not detailed here but understood by one skilled in the art.

Information in the cache line in the prefetch queue 103 is simultaneously written into the instruction cache (tag) memory 121 and the instruction cache (data) memory 105 when the cache line is at the head of the prefetch queue 103, the linefill operation has completed, and the previous entry in at the head of the prefetch queue 103 has been processed.

Once the instruction cache line is loaded into the instruction cache (data) memory 105 each instruction within the cache line is available to the instruction parse/decode logic 107 that is configured to parse and decode the instruction. The parsed instruction is then executed by the instruction execute logic 109. If the executed instruction causes a change in the instruction execution path away from the predicted instruction execution path, the path predictor logic 113 is updated using the update/correct predictor path 111. This comprises a prediction modification mechanism that updates execution history information in the path predictor logic 113 so that future predictions are responsive to the execution history of the instructions within the instruction cache line.

Preferred methods for loading and emptying the prefetch queue 103 as well as adjusting the path predictor logic 113 are subsequently described with respect to FIG. 2, FIG. 3 and FIG. 4 respectively.

One skilled in the art will understand that many path prediction mechanisms can be used when implementing the path predictor logic 113. These include using a single, multiple bit, or correlated predictor state as is known in the art of branch prediction. In addition, the techniques relating to fetch-block predictions described by the application incorporated by reference can also be used.

Figure 2:
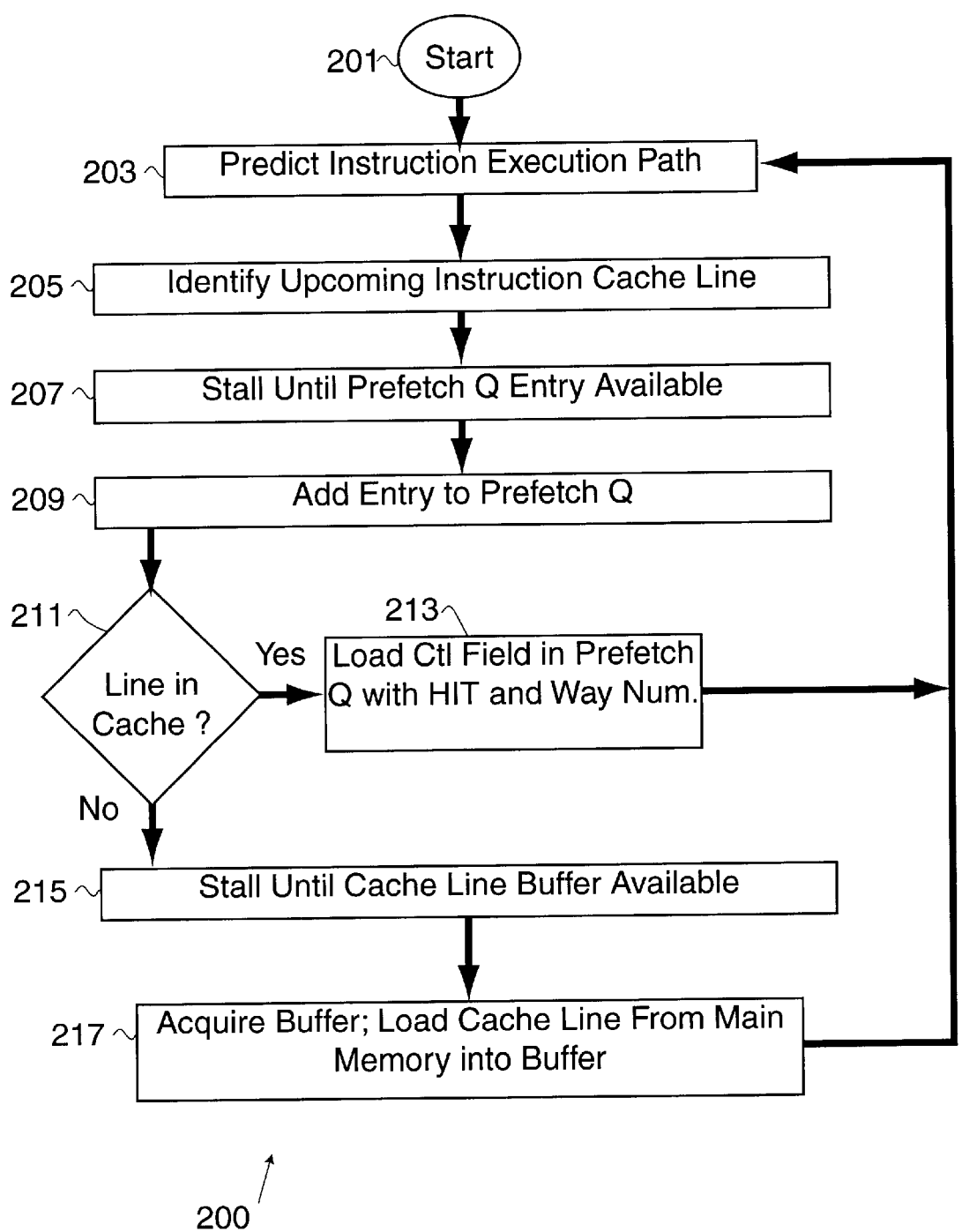
FIG. 2 illustrates a method for loading the prefetch queue using the instruction processing architecture of FIG. 1.

FIG. 2 illustrates a load prefetch queue process 200, used with the instruction processing architecture 100 of FIG. 1. The load prefetch queue process 200 initiates at a 'start' terminal 201 and continues to a 'predict instruction path' step 203. The 'predict instruction path' step 203 uses prediction techniques (as previously discussed) to predict which instructions will be executed based on execution history. An 'identify upcoming instruction cache line' step 205 determines the next expected cache line that contains instructions on the execution path. Some embodiments support a variable number of entries in the prefetch queue 103. Other embodiments use a fixed number of entries. If a fixed number of entries can be in the prefetch queue 103, a 'stall for prefetch queue entry' step 207 stalls the load prefetch queue process 200 until an entry in the prefetch queue 103 becomes available. Once an entry becomes available (or if an entry was available), the load prefetch queue process 200 continues to an 'add entry to prefetch queue' step 209 that queues an entry at the tail of the prefetch queue 103. Next, a 'cache line already in cache' decision step 211 determines whether the cache line determined by the 'identify upcoming instruction cache line' step 205 is already resident in the instruction cache (data) memory 105. If the cache line is already resident in the instruction cache (data) memory 105, the load prefetch queue process is 200 continues to a 'load control field in prefetch queue' step 213. The 'load control field in prefetch queue' step 213 loads the control portion 137 of the new entry with the HIT and the cache way number such that the prefetch queue entry identifies the cache line residing in the instruction cache (data) memory 105. The load prefetch queue process 200 continues back to the 'predict instruction path' step 203 to predict the next cache line in the execution sequence.

However, if the 'cache line already in cache' decision step 211 determined that the cache line found by the 'identify upcoming instruction cache line' step 205 was not already in the instruction cache (data) memory 105, the load prefetch queue process 200 continues to a 'stall for cache line buffer' step 215. Each entry in the prefetch queue 103 includes the data portion 135. In some implementations, the data portion 135 can contain sufficient memory to hold a cache line. Other implementations provide a limited pool of cache line buffers. For implementations that have a pool of cache line buffers, the 'stall for cache line buffer' step 215 stalls the load prefetch queue process 200 until one of the cache line buffers is free. One skilled in the art will understand that the 'stall for cache line buffer' step 215 is not needed if a cache line buffer exists for each entry in the prefetch queue 103. Once a cache line buffer becomes available, a 'load buffer' step 217 acquires the buffer and starts a memory transfer into the cache line buffer of cache line from memory. The load prefetch queue process 200 continues back to the 'predict instruction path' step 203 to predict the next cache line in the execution sequence.

In one preferred embodiment the 'load buffer' step 217 performs its function by acquiring a cache line buffer and initiating a linefill request to the memory system 101 directed toward the acquired cache line buffer.

Thus, the load prefetch queue process 200 queues up entries into the prefetch queue 103.

Figure 3:
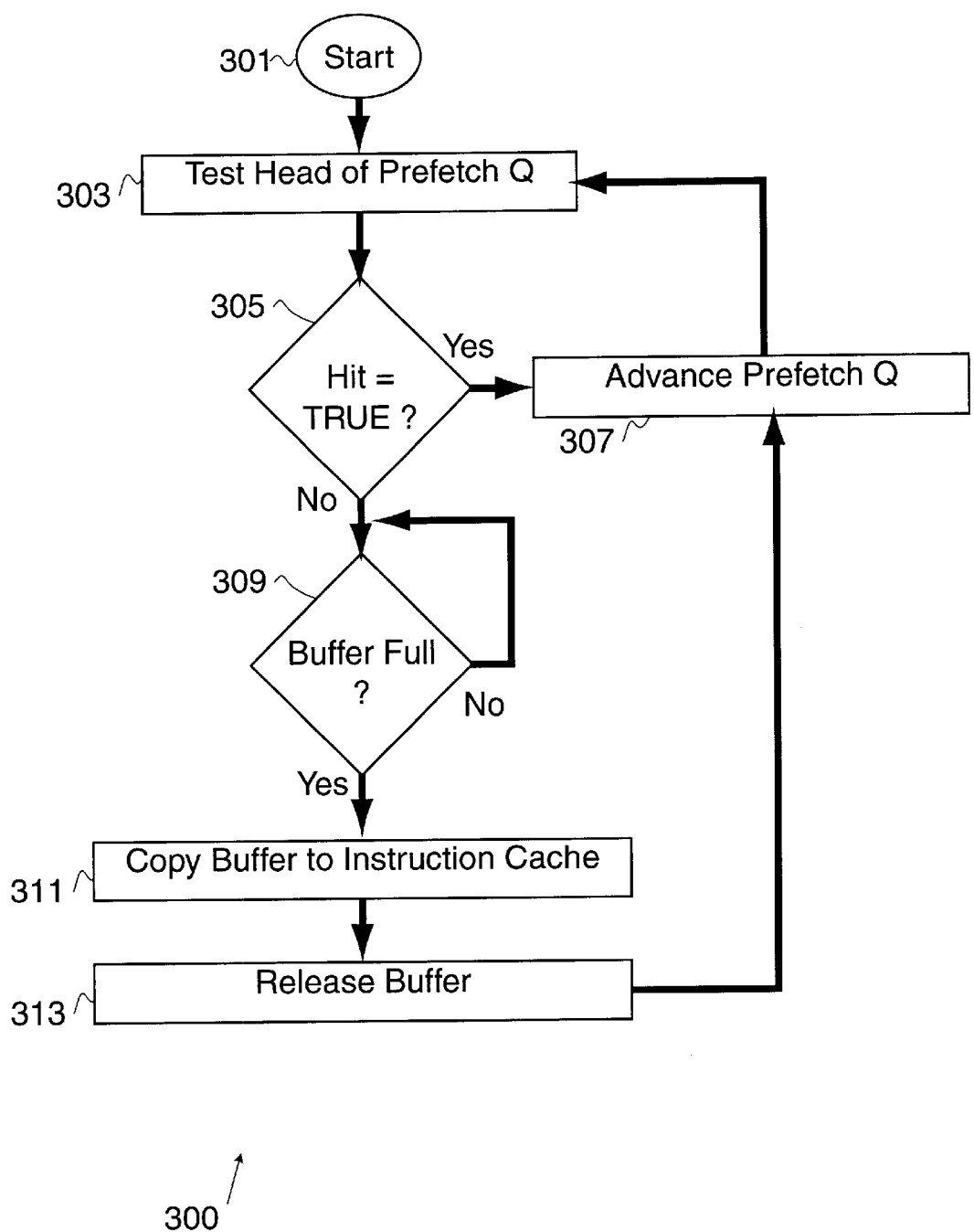
FIG. 3 illustrates a method for loading the instruction cache from the prefetch queue using the instruction processing architecture of FIG. 1.

FIG. 3 illustrates a 'load instruction cache process' 300 that loads the instruction cache (data) memory 105 from the prefetch queue 103 (thus, unloading the prefetch queue 103). The 'load instruction cache process' 300 initiates at a 'start' terminal 301 and continues to a 'test head of prefetch queue' step 303 that examines the control portion 137 of the head entry (for example, the entry at the position indicated by the prefetch queue entry 139) of the prefetch queue 103. A 'cache line hit' decision step 305 determines whether the cache line is already in the instruction cache (data) memory 105 by checking for a HIT in the control portion 137 of the prefetch queue entry 139. If the cache line is already in the instruction cache (data) memory 105, the 'load instruction cache process' 300 continues to an 'advance prefetch queue' step 307 to advance the prefetch queue 103 (thus, moving another entry to the head of the prefetch queue 103 and making an entry available for the 'stall for prefetch queue entry' step 207).

However, if the 'cache line hit' decision step 305 did not detect a HIT, the 'load instruction cache process' 300 continues to a 'buffer full' decision step 309. The 'buffer full' decision step 309 determines whether the cache line transfer from memory initiated by the 'load buffer' step 217 has completed. If the transfer has not completed, the 'load instruction cache process' 300 waits for the cache line to be transferred. Once the cache line is transferred to the buffer, the 'load instruction cache process' 300 continues to a 'copy buffer to instruction cache' step 311 that copies the cache line from the buffer to the instruction cache (data) memory 105. Then a 'release buffer' step 313 releases the buffer (for embodiments that have a restricted number of buffers) for reuse by the 'load buffer' step 217 and the 'load instruction cache process' 300 continues to the 'advance prefetch queue' step 307.

Thus, entries are removed from the prefetch queue 103 and cache lines that are predicted to be needed and not present in the instruction cache data memory are loaded into the instruction cache (data) memory 105.

Figure 4:
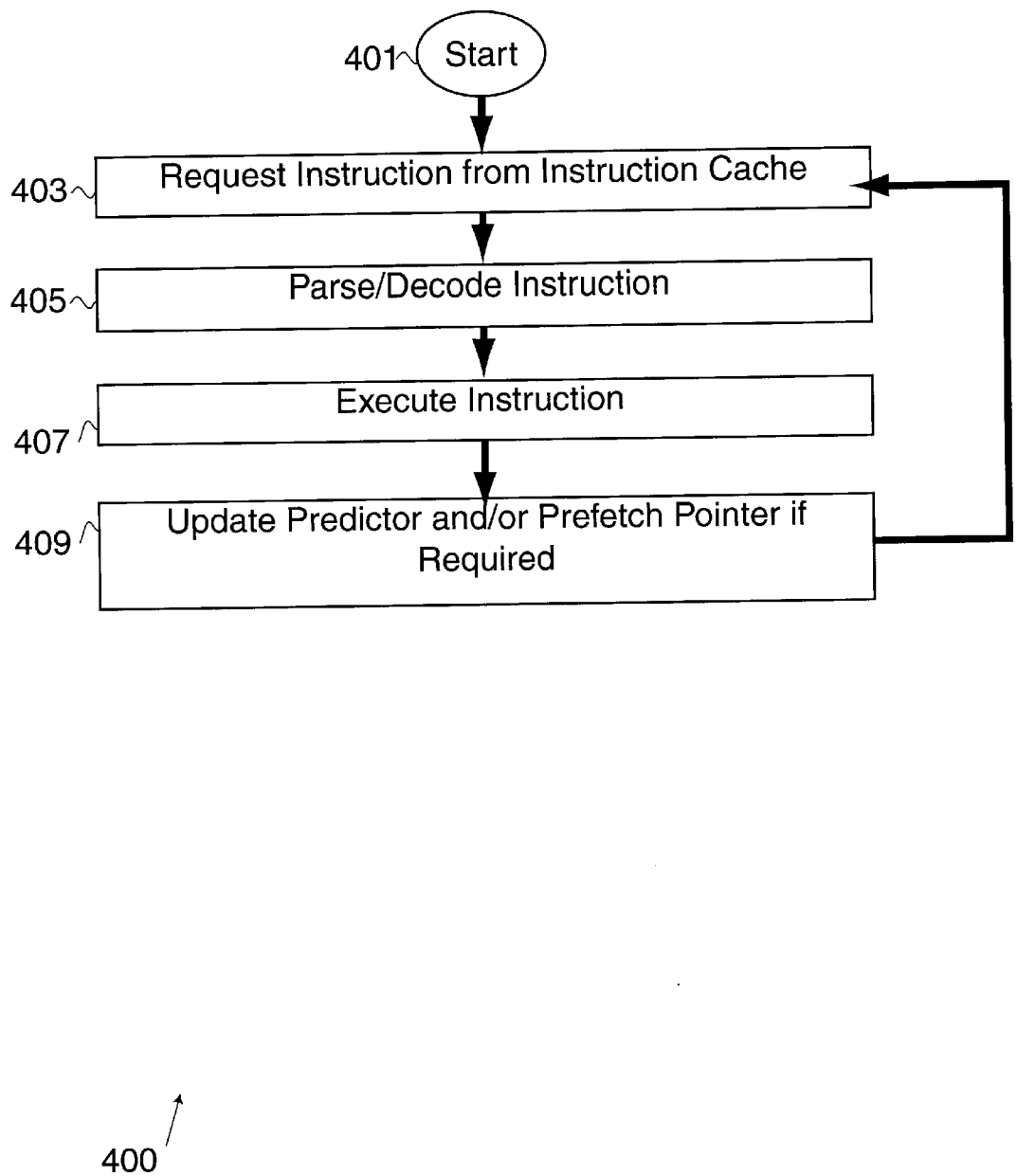
FIG. 4 illustrates a method for executing instruction from the instruction cache using the instruction processing architecture of FIG. 1.

FIG. 4 illustrates an 'instruction execution process' 400 that initiates at a 'start' terminal 401 and continues to a 'request instruction' step 403. The 'request instruction' step 403 requests an instruction from the instruction cache (data) memory 105 using techniques known in the art. A 'parse/decode instruction' step 405 parses and decodes the instruction and an 'execute instruction' step 407 executes the instruction. These steps are also well known in the art. An 'update predictor' step 409 examines the result of the execution of the instruction to determine whether the result of the instruction execution has changed the execution path from what was expected. If the instruction path changed from what was predicted, the path predictor logic 113 is modified by the update/correct predictor path 111 and the prefetch pointer logic 115 is modified to reflect the new execution path. In addition, the prefetch queue 103 is flushed to remove existing entries that were based on the previously predicted execution path.

One skilled in the art will understand that the load prefetch queue process 200 does not show the steps used to initialize the instruction cache (data) memory 105, the instruction cache (tag) memory 121, or the path predictor logic 113. However, such a one would understand how to so initialize.

One skilled in the art will understand that the invention enables multiple linefill requests to be initiated to the memory system 101 before the instruction data contained in the requested cache lines is needed by the instruction parse/decode logic 107. Thus, the latency of accessing the memory system 101 will have less impact on performance of the processor since such memory access will overlap with the operation of the instruction parse/decode logic 107 working on instructions that are younger in the program flow. Thus, the invention reduces processing delays by preloading cache lines from memory based on a predicted execution path.

While preferred embodiments are disclosed herein, many variations are possible which remain within the concept and scope of the invention, and these variations would become clear to one of ordinary skill in the art after perusal of the specification, drawings and claims herein.

What is claimed is:

1. A method for prefetching one or more instruction cache lines from a memory into an instruction cache, said method including steps of:

fetching a set of one or more upcoming instruction cache lines from said memory to a prefetch queue;

loading one of said set from said prefetch queue into said instruction cache after said one of said set is completely fetched from said memory;

predicting an instruction execution path responsive to an address maintained by a prefetch pointer;

identifying said one or more upcoming instruction cache lines on said instruction execution path; and determining which of said one or more upcoming instruction cache lines are to be fetched from said memory.

2. The method of claim 1 further including steps of:

executing one or more instructions from said instruction cache; and updating a path predictor logic responsive to the step of executing.

3. The method of claim 1 wherein said prefetch queue has a fixed number of entries and said method further includes waiting for one or said fixed number of entries to become available prior to the step of loading.

4. The method of claim 1 wherein said prefetch queue has fixed number of cache line buffers and said method further includes waiting for one of said fixed number cache line buffers to become available prior to the step of loading.

5. The method of claim 1 wherein said prefetch queue includes a plurality of entries and the step of fetching further includes storing one of said one or more upcoming instruction cache lines in a buffer associated with one of said plurality of entries.

6. The method of claim 5 wherein the step of loading further includes steps of:

determining whether said buffer contains said one of said one or more upcoming instruction cache lines; and copying said one of said one or more upcoming instruction cache lines from said buffer into said instruction cache.

7. The method of claim 1 wherein the method is performed within by a computer.

8. An apparatus for prefetching one or more instruction cache lines from a memory, said apparatus includes:

a path predictor logic configured to predict an instruction execution path given an address;

a prefetch pointer logic in communication with said memory, the path predictor logic and an instruction cache tag memory;

a prefetch queue, in communication with the prefetch pointer logic, said memory and said instruction cache tag memory, configured to receive an upcoming instruction cache line from said memory and cache control information from said instruction cache tag memory; and an instruction cache data memory configured to receive said upcoming instruction cache line from the prefetch queue;

wherein the prefetch queue includes a plurality of entries each including a control portion and a data portion.

9. The apparatus of claim 8 wherein the prefetch pointer logic is configured to communicate said address in a prefetch pointer to the path predictor logic and to receive a predicted pointer identifying said instruction execution path from the path predictor logic, the prefetch pointer logic also configured to use said instruction cache tag memory to determine whether said upcoming instruction cache line is to be fetched from said memory and if so to request said upcoming instruction cache line from said memory.

10. The apparatus of claim 8 further including:

an instruction execution mechanism configured to execute an instruction received from the instruction cache data memory, the instruction execution mechanism in communication with the path predictor logic.

11. The apparatus of claim 10 wherein the path predictor logic further includes a prediction modification mechanism responsive to the instruction execution mechanism and configured to cause said path predictor logic to provide future predictions responsive to actually executed instructions.

12. The apparatus of claim 8 wherein said data portion can contain said upcoming instruction cache line.

13. The apparatus of claim 8 wherein said data portion references a buffer that can contain said upcoming instruction cache line.

14. The apparatus of claim 13 wherein said buffer is one of a plurality of buffers available to the prefetch queue.

15. The apparatus of claim 8 wherein the prefetch queue includes a fixed number of said plurality of entries.

16. The apparatus of claim 8 wherein the prefetch queue includes a variable number of said plurality of entries.

17. A method of operating a processor comprising the steps of:

loading an instruction cache line of a set upcoming instruction cache lines from a prefetch queue into an instruction cache after said instruction cache line is completely fetched from a memory, wherein an entry in said prefetch queue includes a control portion and a data portion;

predicting an instruction execution path in response to a prefetch pointer address; and identifying upcoming instruction cache lines on said instruction execution path as a function thereof.

18. The method of operation as set forth in claim 17 further comprising the step of determining ones of said identified upcoming instruction cache lines to be fetched from said memory.

19. The method of operation as set forth in claim 17 further comprising the step of fetching said set upcoming cache lines from said memory to a prefetch queue.

20. The method of operation as set forth in claim 17 further comprising the step of executing an instructions from said instruction cache, and updating a path predictor logic in response thereto.

21. The method of operation as set forth in claim 17 wherein said prefetch queue has a fixed number of entries and further comprising the step of waiting for one of said fixed number of entries to become available.

22. The method of operation as set forth in claim 19 wherein said fetching step further comprises the step of buffering one of said upcoming instruction cache lines.

23. A processor comprising:

a path predictor logic that predicts an instruction execution path given an address;

a memory that stores instruction cache lines;

an instruction cache tag memory that stores cache control information; and a prefetch queue configured to receive an upcoming instruction cache line from said memory and cache control information from said instruction cache tag memory, wherein entries in said prefetch queue includes a control portion and a data portion.

24. The processor as set forth in claim 23 further comprising an instruction cache data memory that receives said upcoming instruction cache line from said prefetch queue.

25. The processor as set forth in claim 23 further comprising prefetch pointer logic that:
   communicates said address in a prefetch pointer to said path predictor logic; and
   receives a predicted pointer identifying said instruction execution path from said path predictor logic.

26. The processor as set forth in claim 24 further wherein said prefetch pointer logic uses said instruction cache tag memory to determine whether said upcoming instruction cache line is to be fetched from said memory.

27. The processor as set forth in claim 23 further comprising an instruction execution mechanism configured to execute an instruction received from the instruction cache data memory.

28. The processor as set forth in claim 23 said path predictor logic provides predictions in response to executing instructions.

29. The processor as set forth in claim 23 wherein said data portion comprises said upcoming instruction cache line.

30. The processor as set forth in claim 23 wherein said data portion references a buffer containing said upcoming instruction cache line.

31. The processor as set forth in claim 30 wherein said prefetch queue includes one of a fixed number of entries and a variable number of entries.

* * * * *